United States Patent [19]

Horvitz et al.

[11] 4,152,167
[45] May 1, 1979

[54] MATRIX FORMING COMPOSITION

[75] Inventors: Howard J. Horvitz, Shaker Heights; Anthony P. Gray, Cleveland, both of Ohio

[73] Assignee: Set Products, Inc., Macedonia, Ohio

[21] Appl. No.: 873,799

[22] Filed: Jan. 31, 1978

Related U.S. Application Data

[63] Continuation of Ser. No. 614,886, Sep. 19, 1975, abandoned, which is a continuation-in-part of Ser. No. 408,638, Oct. 23, 1973, abandoned, which is a continuation-in-part of Ser. No. 323,987, Jan. 15, 1973, abandoned.

[51] Int. Cl.$^2$ ............................................. C04B 35/04
[52] U.S. Cl. ........................................ 106/58; 106/85
[58] Field of Search ........................ 106/58, 85, 108.5

[56] References Cited

U.S. PATENT DOCUMENTS

| | | | |
|---|---|---|---|
| 3,285,758 | 11/1966 | Limes et al. | 106/58 |
| 3,357,843 | 12/1967 | Bowman | 106/58 |
| 3,879,209 | 4/1975 | Limes et al. | 106/85 |

FOREIGN PATENT DOCUMENTS

593172  10/1947  United Kingdom ................ 106/108.5

Primary Examiner—James Poer
Attorney, Agent, or Firm—Fay & Sharpe

[57] ABSTRACT

A matrix forming composition is provided which when mixed with water is capable of setting to form a solidified mass which comprises, in weight percent, from about 30 to about 66 percent basic material, from about 25 to about 59 percent water soluble monoammonium phosphate, and from about 1 to about 27 percent water soluble polyphosphate. This matrix forming composition can be utilized to bond various materials together. For example, it is ideal for bonding aggregate materials together to form a solidified mass which is characterized by its high strength.

15 Claims, No Drawings

MATRIX FORMING COMPOSITION

CROSS REFERENCE TO RELATED APPLICATIONS

This application is a continuation of U.S. application Ser. No. 614,886, filed Sept. 19, 1975, now abandoned, which is a continuation-in-part of U.S. Application Ser. No. 408,638, filed Oct. 23, 1973, now abandoned which, in turn, is a continuation-in-part of U.S. Application Ser. No. 323,987, filed Jan. 15, 1973, now abandoned.

BACKGROUND OF THE INVENTION

1. Field of the Invention

The present invention relates to a binder or matrix composition which may be used by itself or mixed with an aggregate or essentially inert filler material to form a solidified mass which is characterized by its high compressive strength. More particularly, the instant invention concerns a matrix forming composition which is capable, when mixed with water, of setting to form a solidified mass which, in weight percent, comprises from about 30 to about 66 percent basic material, from about 25 to about 59 percent water soluble monoammonium phosphate, and from about 1 to about 27 percent water soluble polyphosphate.

2. Description of the Prior Art

The prior art is replete with references that concern the manufacture of various types of inorganic binder materials which may be used either alone or in combination with various fillers to produce a solidified mass. These compositions find utility in many areas of commerce. For example, they are often used as binder materials for various aggregates in the construction industry. Also, they find utility in the fabrication of molded or cast articles, such as precast concrete slabs and the like.

While the construction industry has available to it many binder compositions which perfrom satisfactorily in certain circumstances, there generally is a need for a binder material which can be used either alone or in conjunction with various aggregate materials to produce a solidified mass simply and quickly which is characterized by its exceptional compressive and bonding strengths.

One problem which is especially annoying to those trying to bind aggregate particulate material together with conventional bonding media is that the resultant mixture must be workable and yet set to a cured product in a reasonably short period of time. Heretofore, much difficulty has been experienced in trying to find a binder material for aggregate particles which is characterized by the fact that (1) it is relatively fast setting yet readily workable, (2) the exotherm generated by setting is not so high that it causes differential expansion problems relative to a juxtapositioned material, (3) the resultant set mass must be characterized by a high compressive strength, and (4) little or no health hazards are associated with its use in industry. For example, on setting, some binder materials react to produce toxic gases, whereas, the binders of this invention essentially do not.

The instant invention aids in overcoming the hereinbefore set forth types of problems associated with prior art binder materials by providing a matrix or binder material which when mixed with water is readily workable prior to setting, does not generate an undesirable exotherm, sets to form a solidified mass which is characterized by its exceptionally high compressive strength, and is relatively free from the indicated health hazards.

SUMMARY OF THE INVENTION

Very briefly, the present invention is accomplished by providing a matrix or binder material which comprises from about 30 to about 66 weight percent of a basic material, from about 25 to about 59 percent water soluble monoammonium phosphate, and from about 1 to about 27 percent water soluble polyphosphate. After this matrix composition is mixed with water, either alone or in combination with an aggregate material, it sets to form a solidified mass which is characterized by its high compressive strength.

Binder or matrix material produced according to the teachings of the instant invention finds wide usage in the construction industry. For example, it can be used as a matrix material for stone, brick and the like. In addition, it can be used to produce a fast setting, hard material having exceptional bonding strength which is ideal for repairing floor surfaces and the like. Due to its inherent low coefficient of thermal expansion, the binder or matrix material of the present invention, either by itself or mixed with aggregate material, can be used to patch holes in surfaces such as highways, driveways and the like. When it is used, little or essentially no harmful fumes are generated thereby making it, from a health standpoint, an exceptionally desirable material. This feature is especially beneficial when the matrix material of the invention is used in relatively small, confined areas. Further, it should be noted, that the matrix material of the invention does not cause ferrous materials to rust, but actually protects them from oxidation. In the construction industry, this feature is very important.

As used herein, the term "basic material" shall mean deadburned magnesite, either of a natural or synthetic source, deadburned dolomite, deadburned aluminates of alkali and alkaline earth metals, and deadburned magnesia. However, in the preferred practice of the invention the basic material is deadburned magnesite. Further, in the preferred practice of the invention the basic material is deadburned magnesite which contains about 85.0 to about 99.0 percent magnesium oxide, plus incidental impurities, such as calcium oxide, silicon dioxide, ferric oxide and aluminum oxide.

Also, as used herein, the term water soluble "monoammonium phosphate" shall mean monobasic phosphate, i.e., $NH_4H_2PO_4$.

The term "polyphosphate" shall include water soluble polymerized phosphate compounds with chain lengths containing two or more phosphorus units. In the preferred practice of the invention, polyphosphates having two and three chain units are employed which have the formula $M_{(n+2)}P_nO_{(3n+1)}$ wherein M is a cation and n is either 2 or 3. Specifically, it is preferred to utilize sodium tripolyphosphate, sodium acid pyrophosphate, tetrasodium pyrophosphate and mixtures thereof in the practice of the instant invention.

With regard to the filler or aggregate material which may be utilized in forming a solidified mass which is bonded together by the binder or matrix material of the instant invention, such filler material is preferably essentially inert and includes slag, dolomitic limestone, silica, zircon, zirconia, fused alumina, kyanite, aluminosilicate minerals, rutile, feldspar, granites, chromite, ilmenite, barite, limestone, blast furnace slag and particulate iron base materials.

In addition, in certain circumstances, filler materials which are at least partially reactive, such as fly ash, can also be used in the practice of the invention. In fact, the exact material which can be used in the practice of the instant invention depends on many factors. Essentially, all that is critical is that it does not deleteriously react with the various components of the matrix or binder material and, accordingly, the various filler materials which may be utilized in the practice of the instant invention is not limited to those recited above. However, when the filler material is mixed with the matrix material of the instant invention in order to produce a resultant product characterized by its high compressive strength, it is preferred to employ a composition wherein the weight percent with the filler material present does not exceed about 85 weight percent if the resultant product, that is, binder material plus filler material.

When sand or silica is utilized as the filler material in a high compressive strength product, it is preferred to utilize a mixture of matrix plus filler material which consists of from about 23 to about 45 weight percent matrix material with the remainder, about 55 to about 77 weight percent, being essentially filler material, i.e., silica or sand.

In the practice of the instant invention, water is added to the matrix material to facilitate the reaction which causes the various components thereof to form the final set product. The amount of water utilized can range from about 20 to about 50 weight percent of the matrix material (excluding the filler material), with the exact amount being dependent, in the main, on the degree of fineness of filler material. That is, the finer the filler material, the more water can be used. In the preferred practice of the instant invention, form about 26 to about 37 weight percent (based on the amount of matrix material present), is added to the matrix material to facilitate the desired reaction.

It will be appreciated by those skilled in the art that the amount of water which is required will vary with the specific types and amounts of filler and matrix material which are used. Accordingly, all that is actually required is that an effective amount of water be present, i.e., an amount of water sufficient to cause the desired setting or bonding reaction to take place.

By utilizing the teachings of the instant invention, it is possible to obtain a solidified mass of aggregate particles which is safe, readily workable and after a relatively short setting period is characterized by its exceptionally high compressive strength.

Therefore, it is the primary object of the instant invention to provide a matrix or binder material which can be used alone or to bond together aggregate particulate material to thereby produce a solidified mass which evidences exceptional chemical and physical properties.

Other objects and the means of accomplishing them will be apparent to those skilled in the art from a reading of the following description and claims.

DESCRIPTION OF THE PREFERRED EMBODIMENTS OF THE INVENTION

In the preferred practice of the instant invention, the matrix or binder material is obtained by mixing together from about 30 to about 66 weight percent basic material, from about 25 to about 59 percent water soluble monoammonium phosphate, and from 1 to about 27 percent water soluble polyphosphate. When desired, this matrix material can be admixed with aggregate or filler material to provide a product which when mixed with water sets to form a solidified mass. When producing a product characterized by its high compressive strength, the mixture of matrix material and filler material can consist of up to about 85 weight percent filler material with the remainder being essentially matrix material.

The preferred practice of the instant invention can be best understood by the following examples of the invention which are set forth for illustrative purposes only and are not intended to unduly limit the scope of the invention.

The deadburned magnesite employed in the following Examples in weight percent, consisted of about 88.3 percent magnesium oxide, about 3.7 percent calcium oxide, about 3.7 percent silicon dioxide, about 3.5 percent ferric oxide and about 0.8 percent aluminum oxide.

EXAMPLE 1

A mixture of the following ingredients was obtained:
(a) 450 grams of monoammonium phosphate.
(b) 600 grams of magnesite.

The above ingredients were thoroughly mixed and 130 grams of water was added thereto. The resulting mixture, typifying the prior art, was stirred until smooth and then poured into a mold. This composition remained fluid for about 3 to 4 minutes and hardened thoroughly in about 8 minutes. After 24 hours a 2 in. by 2 in. by 2 in. specimen was removed from the cured article and found to have a compressive strength of 3800 psi.

EXAMPLE 2

A mixture of the following ingredients is obtained:
(a) 600 grams of magnesite.
(b) 390 grams of monoammonium phosphate.
(c) 60 grams of sodium tripolyphosphate.

The above material is then mixed with 130 cubic centimeters of water, stirred until smooth and then poured into a suitable mold. The so-produced composition remains fluid for about 7 to about 8 minutes and then thoroughly hardened in about 15 minutes. After about 24 hours, a 2 in. by 2 in. by 2 in. sample was taken from the so-produced article and its compressive strength found to be 5500 psi. This compressive strength was approximately 31 percent higher than that obtained by material produced according to Example 1.

EXAMPLE 3

A mixture of the following ingredients was obtained:
(a) 150 grams of monoammonium phosphate.
(b) 195 grams of magnesite.
(c) 655 grams of silica sand filler material.

The above ingredients were thoroughly mixed and 110 grams of water was added thereto. The resulting mixture, typical of prior art material containing a filler, was stirred until smooth and then poured into a mold. This composition remained fluid for about 7 to 8 minutes and hardened thoroughly in about 20 minutes. After about 24 hours a 2 in. by 2 in. by 2 in. specimen was removed from the cured article and found to have a compressive strength of 3874 psi.

EXAMPLE 4

A mixture of the following ingredients was obtained:
(a) 195 grams of magnesite.
(b) 130 grams of monoammonium phosphate.
(c) 20 grams of tetrasodium pyrophosphate.

(d) 655 grams of silica sand filler material.

The above ingredients were thoroughly mixed and 110 grams of water was added thereto. The resulting mixture was stirred until smooth and then poured into a mold. This composition remained fluid for about 7 to 8 minutes and hardened thoroughly in about 20 minutes. After about 24 hours a 2 in. by 2 in. by 2 in. specimen was removed from the cured article and found to have a compressive strength of 5115 psi. This compressive strength was approximately 32 percent higher than that obtained by material produced according to Example 3.

EXAMPLE 5

A mixture of the following ingredients was obtained:
(a) 120 grams of magnesite.
(b) 170 grams of monoammonium phosphate.
(c) 55 grams of tetrasodium pyrophosphate
(d) 655 grams of silica sand filler material.

The above ingredients were thoroughly mixed with 90 grams of water. The resultant mixture was stirred until smooth and then poured into a mold. The composition remained fluid for about 8 minutes and hardened thoroughly in about 15 minutes. After about 1 hour a 2 in. by 2 in. by 2 in. specimen was removed from the cured article and found to have a compressive strength of 1395 psi. After about 24 hours a similar size specimen was obtained and found to exhibit a compressive strength of 4340 psi. The compressive strength after 24 hours was approximately 11 percent higher than that obtained by material produced according to Example 3. In addition, it is to be noted that this material exhibited exceptionally good strength after curing for only one hour.

EXAMPLE 6

A mixture of the following ingredients was obtained:
(a) 155 grams of magnesite.
(b) 105 grams of monoammonium phosphate.
(c) 85 grams of tetrasodium pyrophosphate.
(d) 655 grams of silica sand filler material.

The above ingredients were thoroughly mixed with 90 grams of water. The resultant mixture was stirred until smooth and then poured into a mold. The composition remained fluid for about one minute and hardened thoroughly in about 4 minutes. After about one hour a 2 in. by 2 in. by 2 in. specimen was removed from the cured article and found to have a compressive strength of 2480 psi. After 24 hours a similar size specimen was obtained and found to exhibit a compressive strength of 4185 psi. The compressive strength after 24 hours was approximately 8 percent higher than that obtained by material produced according to Example 3. In addition, it is to be noted that this material exhibited exceptionally good strength after curing for only one hour.

EXAMPLE 7

A mixture of the following ingredients was obtained:
(a) 195 grams of magnesite.
(b) 125 grams of monoammonium phosphate.
(c) 25 grams of sodium tripolyphosphate.
(d) 655 grams of silica sand filler material.

The above ingredients were thoroughly mixed and 110 grams of water was added thereto. The resulting mixture was stirred until smooth and then poured into a mold. This composition remained fluid for about 6 to 7 minutes and hardened thoroughly in about 15 minutes. After about 24 hours a 2 in. by 2 in. by 2 in. specimen was removed from the cured article and found to have a compressive strength of about 5732 psi. This compressive strength was approximately 48 percent higher than that obtained by material produced according to Example 3.

From the foregoing data and information it is readily apparent that applicants have provided a matrix forming material which can be used by itself or to bond together various materials to produce a resulting product which exhibits superior physical properties.

In addition, in certain circumstances, it may be desirable to add a pigment to the compositions of the invention. Typical examples of such pigments are inert oxides such as black iron and the oxides of titanium and chromium. A typical example of such a composition is as follows:

EXAMPLE 8

A mixture of the following ingredients was obtained:
(a) 196 grams of magnesite.
(b) 125 grams of monoammonium phosphate.
(c) 25 grams of tetrasodium pyrophosphate.
(d) 653 grams of silica sand.
(e) 1 gram of black iron oxide.

The above ingredients were thoroughly mixed with 110 grams of water. The resultant mixture was stirred until smooth and then poured into a mold. The composition remained fluid for about 6 minutes and hardened thoroughly in about 15 mins. After 24 hours a 2 in. by 2 in. by 2 in. specimen was obtained and found to exhibit a compressive strength of 5735 psi.

In the main, the present invention has been described with respect to its use as a matrix material for forming a solidified mass which is characterized by its high compressive strength. However, it should be pointed out that the matrix material of the present invention also finds use as a refractory bonding agent in various situations where high initial compressive strength is not necessarily required. For example, a composition consisting of about 4 weight percent matrix material (of the type described herein) has been mixed with about 96 weight percent filler material (silica sand) to produce a material which when mixed with water is ideally suited for use as a mortar or ramming paste. In such applications it has been found to be highly desirable to employ a mixture consisting of from about 85 to about 97 weight percent filler and from about 3 to about 15 weight percent matrix material. However, these relative ranges of ingredients may vary depending on the specific kind and type of filler material utilized.

While there have been described herein what are at present considered to be the preferred embodiments of the invention, it will be obvious to those skilled in the art that various changes and modifications may be made therein without departing from the spirit and scope of the invention as hereinafter claimed.

What is claimed is:

1. A dry matrix forming composition capable, when mixed with water of setting to form a solidified mass characterized by its high compressive strength which, in weight percent consists essentially of:
    (a) form about 30 to about 66 percent basic material containing at least about 85 percent magnesium oxide;
    (b) from about 25 to about 59 percent water soluble monoammonium phosphate; and
    (c) from about 1 to about 27 percent water soluble polyphosphate having the formula $M_{(n+2)}P_nO_{(3n+1)}$ wherein M is a cation and n is the integer 2 or 3.

2. The matrix forming composition of claim 1 wherein said basic material is deadburned magnesite.

3. The matrix forming composition of claim 2 wherein said magnesite comprises from about 85 to about 99 weight percent magnesium oxide.

4. The matrix forming composition of claim 1 wherein said polyphosphate is sodium tripolyphosphate, sodium acid pyrophosphate, tetrasodium pyrophosphate or mixtures thereof.

5. A cry composition capable, when mixed with water of setting to form a solidified mass characterized by its high compressive strength comprising in weight percent, up to about 85 percent of a filler material with the remainder being a matrix material consisting of from about 30 to about 66 percent of a basic material containing at least about 85 percent magnesium oxide, from about 25 to about 59 percent water soluble monoammonium phosphate, and from about 1 to about 27 percent water soluble polyphosphate having the formula $M_{(n+2)}P_nO_{(3n+1)}$ wherein M is a cation and n is the integer 2 or 3.

6. The composition of claim 5 wherein said filler material is selected from the group consisting of dolomitic limestone, silica, zircon, zirconia, fused alumina, kyanite, aluminosilicate minerals, rutile, feldspar, granites, chromites, ilmenite, barite, iron particles, limestone, blast furnace slag, fly ash and mixtures thereof.

7. The composition of claim 6 wherein said filler material is silica.

8. The composition of claim 7 wherein said silica is present, in weight percent, in an amount ranging from about 55 to about 77 percent of said total composition.

9. The compositin of claim 5 wherein said basic material is deadburned magnesite.

10. The composition of claim 5 wherein the polyphosphate is selected from the group consisting of sodium acid pyrophosphate, sodium tripolyphosphate, tetrasodium pyrophosphate and mixtures thereof.

11. A process for forming a solidified cementitious mass which is characterized by its high compressive strength which process comprises the steps of:
 (a) providing in dry powdered form a matrix forming composition consisting essentially of;
  (i) from about 30 to about 66 percent of basic material containing at least about 85 percent magnesium oxide;
  (ii) from about 25 to about 59 percent by weight of water soluble monoammonium phosphate;
  (iii) from about 1 to about 27 percent by weight of water soluble polyphosphate having the formula $M_{(n+2)}P_nO_{(3n+1)}$ wherein M is a cation and n is the integer 2 to 3;
 (b) adding water to said matrix composition form a wetted mass, and
 (c) forming said wetted mass into the desired shape and subsequently permitting it to solidify.

12. The process of claim 11 which further includes the steps of adding a filler material to said wetted mass prior to forming said wetted mass into the desired shape.

13. The process of claim 12 wherein said filler material is selected from the group consisting of dolomite limestone, silica, zircon, zirconia, fused alumina, kyanite, aluminosilicate minerals, rutile, feldspar, granites, chromites, ilmenite, barite, iron particles, limestone, blast furnace slag, fly ash and mixtures thereof.

14. The process of claim 13 wherein said filler material is silica.

15. The process of claim 14 wherein said silica is present, in weight percent, in an amount ranging from about 55 to about 77 percent of said total composition.

* * * * *